Oct. 21, 1969   H. F. DATES   3,473,944

RADIATION-REFLECTING MEDIA

Filed Sept. 22, 1966   2 Sheets-Sheet 1

INVENTOR.
Harold F. Dates
BY Charles W. Gregg
AGENT

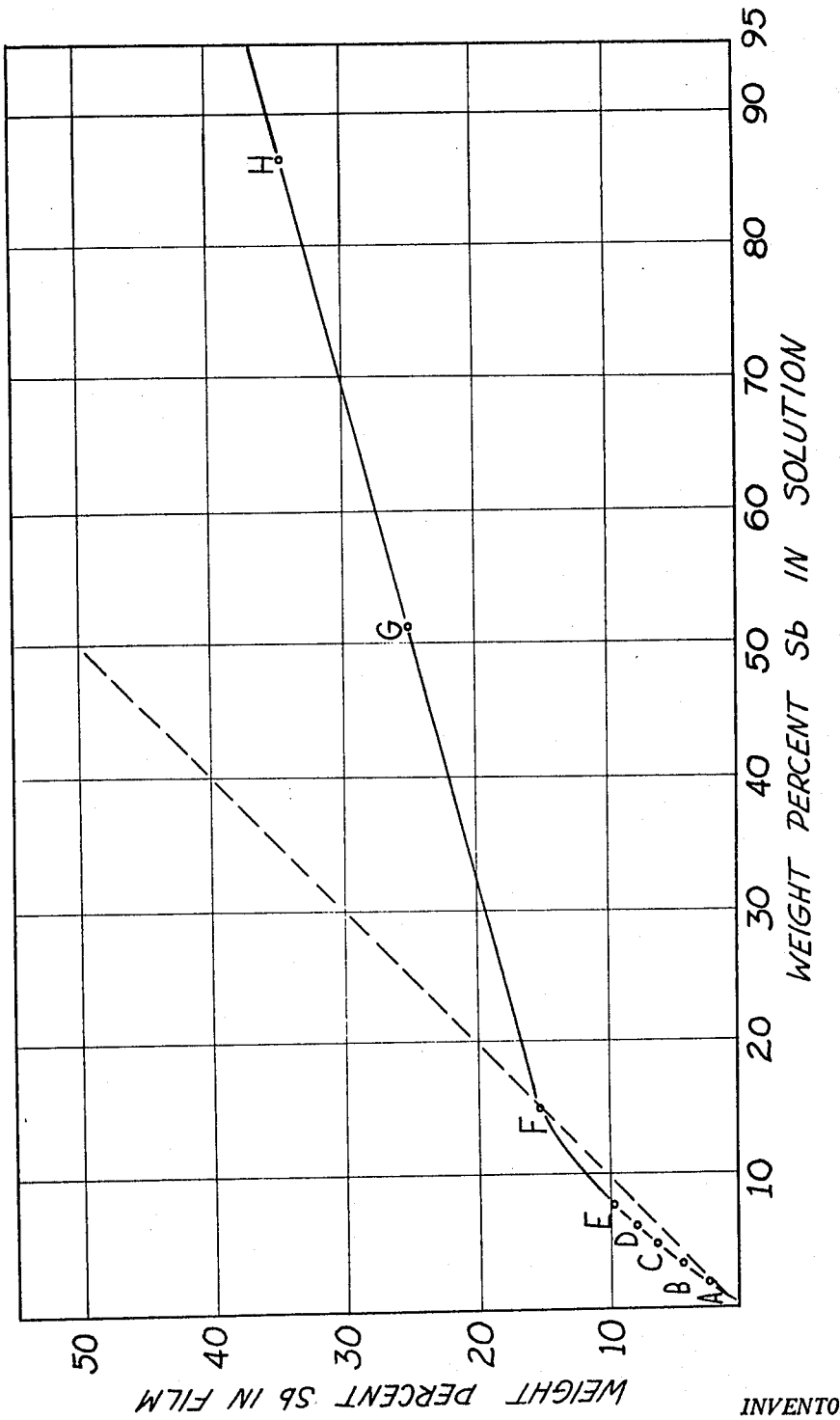

3,473,944
RADIATION-REFLECTING MEDIA
Harold F. Dates, Corning, N.Y., assignor to Corning Glass Works, Corning, N.Y., a corporation of New York
Filed Sept. 22, 1966, Ser. No. 581,207
Int. Cl. B29d *11/00;* C03c *17/22*
U.S. Cl. 117—33.3                                                 2 Claims

ABSTRACT OF THE DISCLOSURE

A radiation-reflecting medium comprising a transparent glass sheet coated on opposite sides with two films of different compositions, one film consisting essentially of an oxide of antimony and an oxide of tin containing about 25–36.5% by weight of antimony, and a second film consisting essentially of an oxide of antimony and an oxide of tin containing about 2.2–6.4% by weight of antimony.

---

Figure 1:
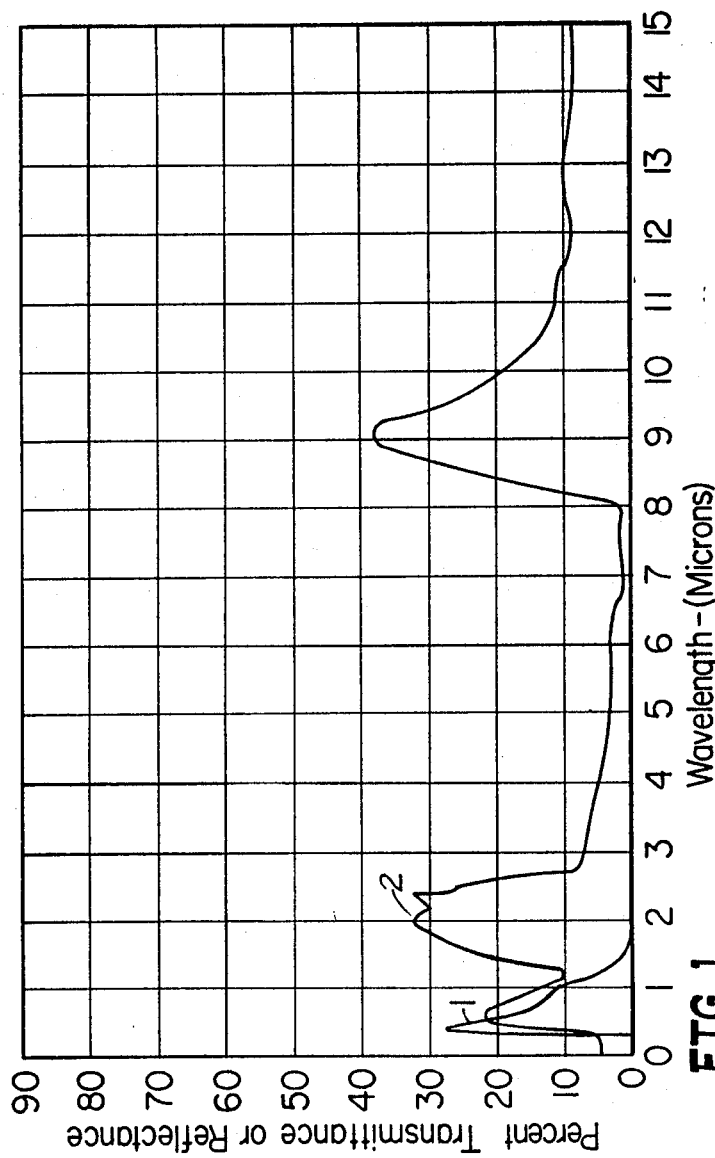

This invention relates to radiation-reflecting media and in particular to novel combinations of films for use therein.

Radiation-reflecting films are well known, and specific compositions comprising certain iridized metallic oxide films are disclosed, for example, in U.S. Patent 2,564,708, issued to J. M. Mochel. Such coatings have limited utility, however, in that their reflective efficacy for solar shielding purposes is substantially limited to wave lengths in the far infrared portion of the spectrum, which portion contains only a negligible part of the energy emitted by the sun.

It has relatively recently been found that metallic oxide films, such as disclosed in the above-cited U.S. Patent 2,564,708, could be advantageously combined with films having the ability to absorb and reflect energy in the visible and near infrared portions of the spectrum, thereby providing satisfactory heat-shielding qualities. However, such film combinations have been generally aesthetically unsatisfactory in that the apparent colors of objects viewed therethrough are distorted. Although such distortion could be tolerated in certain industrial applications, it is considered desirable that the distortion be eliminated in applications where human comfort is a factor, such as homes and office building, and in other applications where it is necessary that objects be seen in their natural colors. Accordingly, there was developed combination films such as disclosed in United States Patent 3,149,989, issued Sept. 22, 1964 to Harold C. Johnson, and in copending application, Ser. No. 404,557, filed Oct. 8, 1964, and now abandoned, and assigned to the present assignee.

While the novel combination films disclosed in the above-cited patent and patent application are satisfactory form any installations, further intensive investigation has revealed that film combinations having other radiation-shielding characteristics are oftentimes desirable. The radiation-reflecting media of the present application have thereby resulted. It is, accordingly, an object of the present invention to provide a glass panel or windowpane which is an efficient radiation-reflecting medium and which at the same time permits objects viewed therethrough to be seen in their natural colors.

It is a further object to provide a heat-reflecting glass panel or windowpane which reflects and also absorbs a substantial amount of radiation throughout the visible portions of the spectrum so as to prevent glare while at the same time permitting objects to be viewed therethrough without distortion of color.

These objects are accomplished by the provision of radiation-shielding glass panel or windowpane comprising a transparent material having thereon two films, each comprising a mixture of the oxides of tin and antimony, the film located nearer the source of radiation being an absorbing and reflecting film, hereinafter oftentimes referred to as the absorbing film, and the film located farther from the said source being a reflecting film.

The invention will be described with reference to the accompanying drawing, in which:

FIG. 1 is a graph giving, in curves 1 and 2 respectively, the approximate percentages of radiation transmitted and reflected at various wave lengths by a film combination utilized in a preferred embodiment of the invention.

Figure 2:

FIG. 2 is a sectional view of a sheet or panel of glass having thereon a combination of films according to the present invention; and FIG. 3 is a graph showing, as a function of solution composition, the average measured weight percent of antimony in oxide films produced by application to a hot glass surface of solutions comprising as their film-forming solutes various percentages of $SnCl_4 \cdot 5H_2O$ and $SbCl_3$.

As previously mentioned, the energy-reflecting and absorbing medium of the present invention comprises two films. These films are formed by conventional and well-known methods which generally comprise contacting heated glass surfaces with a vapor or an atomized solution of one or more thermally decomposable metal salts or metallo-organic compounds which decompose to produce corresponding metallic oxide film on the heated surfaces. For a more detailed description, reference is made to previously mentioned U.S. Patent 2,564,708.

As also previously mentioned, the films of this invention are produced by application to said heated glass surfaces of solutions comprising as their film-forming solutes varying percentages of $SnCl_4 \cdot 5H_2O$ and $SbCl_3$, such solutes decomposing to form oxides of the respective metals when they are applied to heated glass surfaces. Eight different solutions designated A through H were obtained by mixing varying percentages of two basic solutions designated #1 and #2. The first of such basic solutions (solution #1) comprised 1 gram $SbCl_3$ per ml. of solution, and $1:1H_2O$:concentrated HCl as a solvent. The second basic solution (solution #2) comprised 1 gram $SnCl_4 \cdot 5H_2O$ per ml. of solution, and $5:1H_2O$:concentrated HCl The spray solutions A through H were obtained by mixing the basic solutions, by volume, as set forth in the following Table 1.

TABLE I

|  | Basic Solution #1 | Basic Solution #2 |
|---|---|---|
| Solution: | | |
| A | 1% | 99% |
| B | 2% | 98% |
| C | 3% | 97% |
| D | 4% | 96% |
| E | 5% | 95% |
| F | 10% | 90% |
| G | 40% | 60% |
| H | 80% | 20% |

The weight percent of antimony, rather than volume percent of the oxides thereof, in films formed by spraying each of the above eight different solutions A through H of $SnCl_4 \cdot 5H_2O$ and $SbCl_3$ for each of four different periods of time on heated glass surfaces has been determined or measured by X-ray fluorescence techniques. Two runs of each solution for each period of time were made in most instances. The results of such determination or measurements are given in Table II which follows and which also sets forth the average weight percent of antimony in the films produced from each solution and the weight percent of antimony computed to be in each of the solutions A through H. The graph of FIG. 3 was drawn from the information obtained by said measurements. The letters A through H shown on the graph correspond to the solution designated by the letters A through H of the table, as is readily apparent. It will be understood that the part of each film which does not comprise an oxide of antimony comprises substantially an oxide of tin.

From a brief study of the graph of FIG. 3 and the following table, it appears that spray solutions containing less than about 15% antimony result in oxide films whose antimony content is higher than that of each respective solution. Spray solutions containing more than about 15% antimony result in oxide films whose antimony content is lower than each respective solution, and a linear relationship exists between the solutions and the respectively resultant oxide films. Furthermore, it appears that longer spray times produce only slightly higher antimony concentrations in the respectively resulting films.

TABLE II

| Solution: | Spray time, secs. | Weight percent Sb in film | | Weight percent Sb in film, average two runs | Weight percent Sb in film, average all sprays | Weight percent Sb in solution |
|---|---|---|---|---|---|---|
| | | Run 1 | Run 2 | | | |
| A | 2 | 2.23 | 2.21 | 2.22 | | |
| | 4 | 2.27 | 2.23 | 2.25 | 2.27 | 1.57 |
| | 6 | 2.29 | 2.30 | 2.30 | | |
| | 8 | 2.33 | 2.30 | 2.32 | | |
| B | 2 | 4.03 | 4.05 | 4.04 | | |
| | 4 | 4.30 | 4.29 | 4.30 | 4.57 | .312 |
| | 6 | 4.97 | 4.99 | 4.98 | | |
| | 8 | 5.08 | 4.84 | 4.96 | | |
| C | 2 | 6.34 | 6.32 | 6.33 | | |
| | 4 | 6.66 | 6.55 | 6.60 | 6.59 | 4.65 |
| | 6 | 6.69 | 6.64 | 6.66 | | |
| | 8 | 6.83 | 6.68 | 6.76 | | |
| D | 2 | 7.65 | 7.74 | 7.70 | | |
| | 4 | 8.04 | 7.82 | 7.93 | 8.20 | 6.16 |
| | 6 | 8.32 | 8.18 | 8.25 | | |
| | 8 | 8.93 | 8.88 | 8.90 | | |
| E | 2 | 9.18 | 9.19 | 9.18 | | |
| | 4 | 9.57 | 9.40 | 9.48 | 9.70 | 7.66 |
| | 6 | 10.18 | 10.11 | 10.14 | | |
| | 8 | 9.93 | 10.04 | 9.98 | | |
| F | 2 | 15.26 | 15.03 | 15.15 | | |
| | 4 | 15.16 | -------- | 15.16 | 15.39 | 14.90 |
| | 6 | 16.56 | 15.40 | 15.48 | | |
| | 8 | 15.79 | 15.73 | 15.76 | | |
| G | 2 | -------- | 24.65 | 24.65 | | |
| | 4 | 24.87 | 24.98 | 24.92 | 24.88 | 51.24 |
| | 6 | 24.96 | 25.20 | 25.08 | | |
| | 8 | -------- | -------- | -------- | | |
| H | 2 | 34.69 | 33.80 | 34.25 | | |
| | 4 | 34.56 | 33.94 | 34.25 | 34.44 | 86.31 |
| | 6 | 34.84 | 34.59 | 34.71 | | |
| | 8 | 34.64 | 34.44 | 34.54 | | |

It has been found that an extremely satisfactory reflecting medium can be produced when the absorbing coating is deposited from solution H which comprises $SnCl_4 \cdot 5H_2O$ and $SbCl_3$ in the ratio 20:80 by weight, and the reflecting containing is deposited from a solute comprising these components in the ratio 96:4 by weight. Referring to FIG. 3, it will be seen that the first of such solutes results in an oxide film comprising approximately 32.5 by weight of antimony while the second of such solutes results in an oxide film comprising approximately 6.0% by weight of antimony.

FIG. 1 presents transmittance and reflectance data, in curves 1 and 2 respectively, for a combination of films as outlined above and in which the absorbing and reflecting coatings have thicknesses described respectively as first order white and fourth order green. The films are deposited on opposite sides of a sheet of borosilicate glass as illustrated in FIG. 2 of the drawings, such glass having a composition, for example, of approximately 80% $SiO_2$, 14% $B_2O_3$, 4% $Na_2O$ and 2% $Al_2O_3$ by weight, and a thickness of ¼ inch.

It can be seen from the curves of the graph of FIG. 1 that the preferred film combination reflects heat radiations in amounts up to approximately 38% of that of a given wave length falling upon the glass sheet having such film combination thereon while reflecting approximately 23% of the visible radiations falling upon the glass sheet. Transmittance of visible radiation varies within the range of approximately 20–28% while no heat radiations having a wavelength longer than about 1.8 microns are transmitted.

The curves of FIG. 1 do not represent precisely the overall transmittance and reflectance characteristics of the combination under operating conditions. It would be expected that under such conditions the sum of the total energy transmitted and reflected would approximate 100% of that falling upon the medium. This percentage is not approached in the curves of FIG. 1, since the data was taken from a window which had not been heated to its operating temperature, and hence the disparity represents absorbed radiation. In actual operation this energy would be partly conducted away and partly re-emitted as heat radiations mostly in the far infrared portion of the spectrum. However, the reflecting coating which, referring to FIG. 2, is always disposed farthest from the source of radiation, would reduce the energy re-emitted from the side farthest from the source of radiation, thus providing improved heat shielding qualities. Under conditions of actual use the described combination of films transmits approximately 25% of the energy falling thereon, thus giving substantial heat and glare reduction while permitting objects viewed therethrough to be seen in their natural colors.

The absorbing coating of the invention may be varied through a wide range of compositions and is always disposed nearest the source of radiation as previously mentioned. Transmittance of luminous energy generally increases with increased concentration of antimony. When the absorbing coating solute contains about 95% $SbCl_3$ by weight (approximately 36.5% Sb by weight in the film as determined from the graph of FIG. 3) and such film is utilized alone, a luminous transmittance of about 80% results. When the absorbing coating solute contains approximately equal amounts of $SbCl_3$ and $SnCl_4 \cdot 5H_2O$ by weight (approximately 25% Sb by weight in the film as determined from the graph of FIG. 3), luminous transmittance of the absorbing film alone is approximately 60%. All absorbing films within this range permit objects to be viewed in their natural colors—the glass itself being neutral or gray in appearance. As the amount of $SbCl_3$ is decreased below 50% in the solute, objects viewed by transmitted light begin to take on a purple tint. Accordingly, it has been found advantageous to limit the weight percent of antimony in the absorbing coating solute within the above range.

The reflecting coating may vary within the range approximately 1.5–5.0% $SbCl_3$ by weight in the solute (approximately 2.2–6.4% by weight in the resultant film as determined from the graph of FIG. 3). The higher percentages result in a reduction in the transmittance of visible radiations which is beneficial in reducing undesirable glare from the luminous source of heat radiation. Lower percentages permit increased luminous energy to be transmitted. However, throughout the stated range the reflecting power of the reflecting coating is substantially unchanged, thus substantially reducing the energy re-emitted from the side farthest from the source of radiation. Variations in film thickness do not affect the color of objects viewed through the films. The effect of increasing film thicknesses is to decrease the transmission of both visible and heat radiations. In general, the films may have thicknesses up to a maximum of about 8,000 angstrom units.

What is claimed is:

1. A radiation-reflecting medium comprising a substantially transparent glass sheet having on opposite surfaces thereof a film of different composition, the first of said films consisting essentially of an oxide of antimony and an oxide of tin, there being about 25–36.5% by weight of antimony in the film, and the second film consisting essentially of an oxide of antimony and an oxide of tin, there being about 2.2–6.4% by weight of antimony in said second film.

2. A radiation-reflecting medium according to claim 1 wherein said first film contains about 32.5% by weight of antimony and said second film contains about 6% by weight of antimony.

References Cited

UNITED STATES PATENTS

| | | | |
|---|---|---|---|
| 2,564,677 | 8/1951 | Davis | 117—69 X |
| 2,564,708 | 8/1951 | Mochel | 117—33.3 |
| 3,149,989 | 9/1964 | Johnson | 117—33.3 |

FOREIGN PATENTS 466,325  7/1950  Canada.

WILLIAM D. MARTIN, Primary Examiner

U.S. Cl. X.R.

117—69, 124